Jan. 1, 1929.  1,697,665
F. S. SHIELDS
COMBINED PLOW AND SOIL PULVERIZING IMPLEMENT
Filed March 19, 1926   2 Sheets-Sheet 2
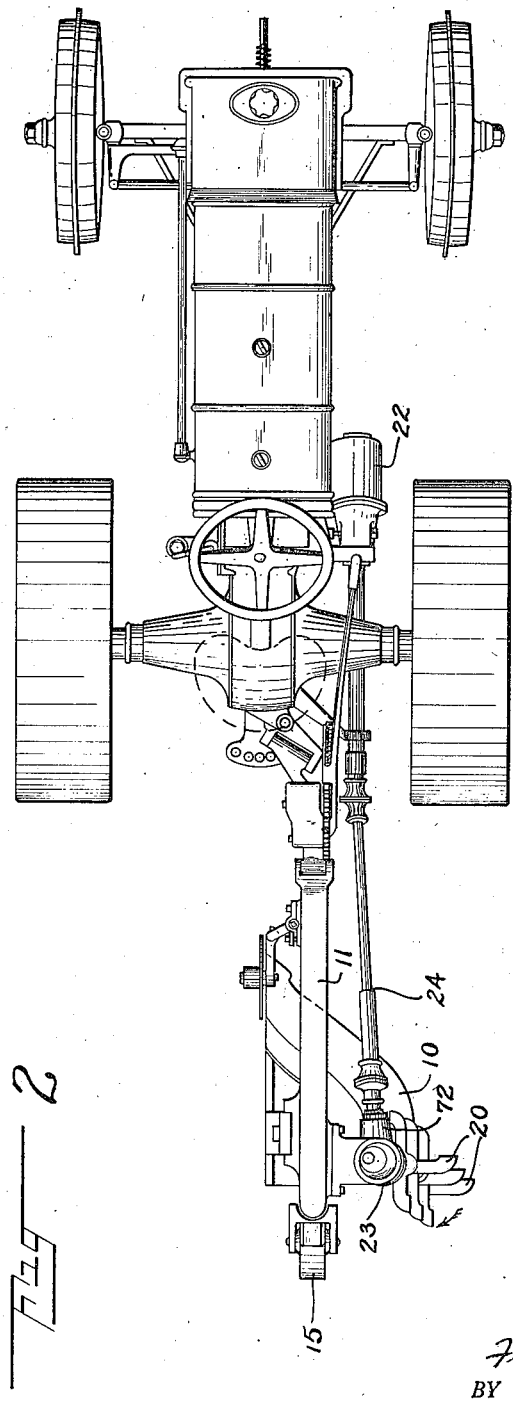
INVENTOR.
Frank S. Shields
BY
                    ATTORNEYS.

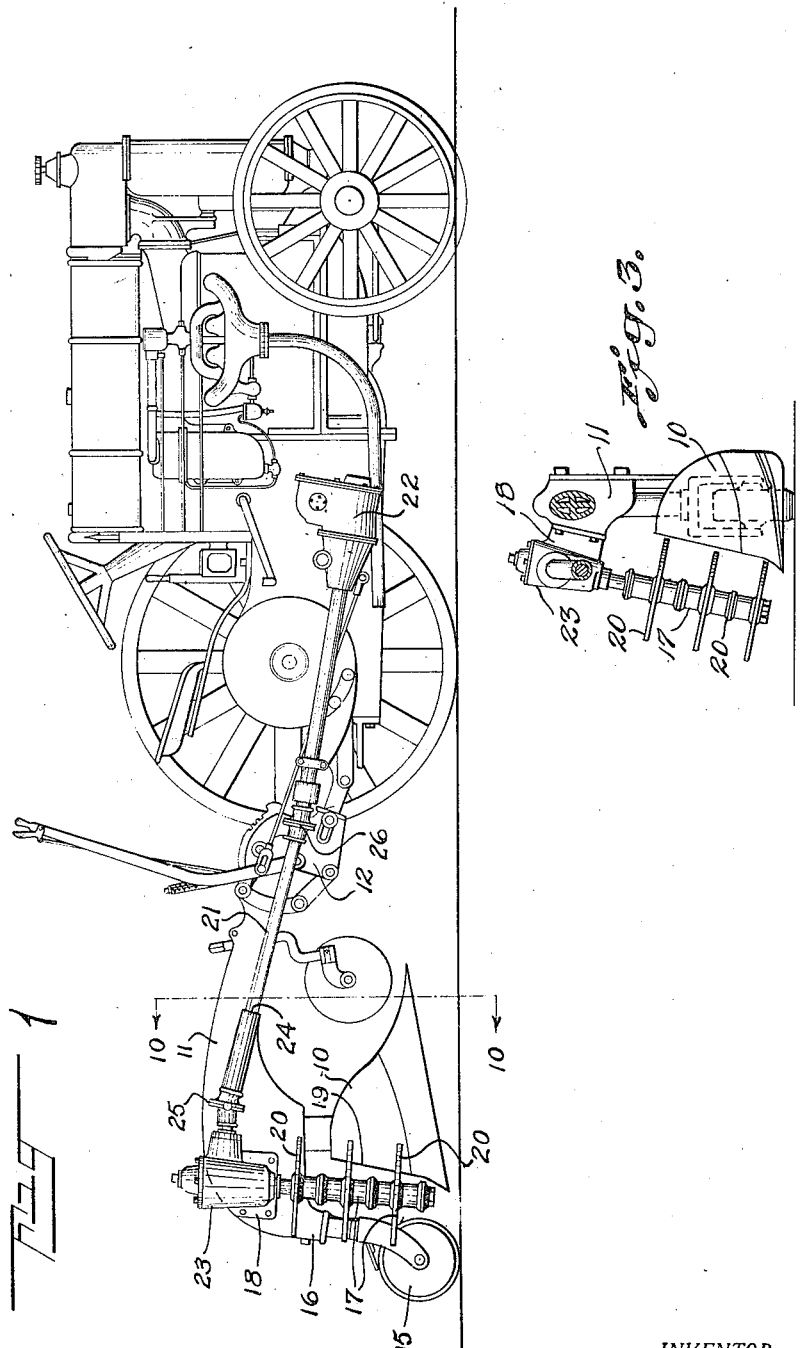

Patented Jan. 1, 1929.

1,697,665

UNITED STATES PATENT OFFICE.

FRANK S. SHIELDS, OF NEW YORK, N. Y., ASSIGNOR, BY MESNE ASSIGNMENTS, TO GENERAL IMPLEMENT COMPANY, OF RACINE, WISCONSIN, A CORPORATION OF DELAWARE.

COMBINED PLOW AND SOIL-PULVERIZING IMPLEMENT.

Application filed March 19, 1926. Serial No. 95,833.

This invention includes a plow especially adapted to be operated by a power tractor and having a rotatable soil pulverizing device mounted on a substantially vertical axis in a position to operatively engage the freshly turned surface of the furrow slice. The pulverizing device is arranged to rotate in a direction to engage the furrow slice just as it leaves the rearward edge of the moldboard and to break up and throw the soil into the furrow with the stubble and litter in a covered condition at the bottom thereof.

A feature of the invention resides in the elimination of the rearward portion of the plow moldboard and the mounting of the soil pulverizer at the rearward edge thus provided and adjacent the plowed-land side of the furrow.

Another feature of the invention resides in the provision of a relatively small caster wheel for operation in the furrow closely adjacent the heel of the plow.

Still another feature of the invention resides in the provision of a power lifting device by means of which the pull of the tractor may be applied to lift the plow out of the ground.

Other features of the invention will be hereinafter referred to.

In the drawings, in which a preferred embodiment of the invention has been selected for illustration:

Figure 1 is a view in side elevation of a tractor-pulled combination plow and soil pulverizer embodying the invention, the tractor having a rear wheel removed for clearness of illustration.

Figure 2 is a plan view of the devices shown in Figure 1.

Figure 3 is a view in vertical section taken on the line 10—10 of Figure 1.

Referring to the drawings for a more detailed description of the invention, a plow 10 is coupled at the forward end of the beam 11, to a hitch device 12 which in turn is attached to the draw bar head 13, of a tractor 14. The rearward end of the plow beam 11, is supported on a relatively small trailer or furrow wheel 15 which has a pivoted or caster support in the plow beam at 16.

A feature of the invention resides in the mounting of a rotatable soil pulverizer 17, in a bracket 18 on the beam 11, the pulverizer being thus supported in a position at the plowed-land side of the furrow and adjacent the rearward edge 19 of the plow moldboard. It will be seen that the ordinary rearward extension of the plow moldboard is eliminated in order to accommodate the pulverizer 17.

With the structural arrangement referred to, the pulverizer 17 rotates in a clockwise direction so that the blades 20 engage the freshly turned surface of the furrow slice just as it passes from the edge of the short moldboard of the plow 10, and throws the soil forwardly and outwardly into the furrow. This manner of engagement of the pulverizing blades with the rear or underneath side of the furrow slice insures the covering of stubble and litter by the pulverized soil and produces a pulverized seed bed with stubble and litter turned underneath.

Another useful effect of the mounting of the pulverizer in the position shown is the economical use of power which results. It will be seen that the engagement of the soil in a direction to throw it away from the moldboard, relieves the moldboard of the friction of the material, a further saving of friction being effected by the relatively short surface presented by the moldboard for the travel of the furrow slice therealong. In addition to the economy of power thus effected, it has been found that the structure described will function with different soils which have heretofore been worked with plows of the disc type.

The function of the plow share is to cut a furrow slice in the ordinary manner and the mold board is so shaped as to simply lift the furrow slice to a nearly upright position and to perform the function of doing only the initial part of the turning over movement of the furrow slice. The pulverizer is placed so close to the rear end of the plow share that the entire furrow slice will be engaged by the pulverizer blades and thoroughly pulverized from a point near the lower edge of the furrow slice to the upper portion thereof and the turning over movement completed before the furrow slice can slide off the mold board toward the previously turned furrow, when operating at any plowing speed.

The pulverizer 17 is driven through a rotatable shaft 21, connected at its forward end to a power-takeoff device 22, carried by the tractor and at its rearward end to an operating head 23, which supports the pulverizer 17. The operating shaft 21 contains a telescopic joint structure 24 and a pair of universal joints 25 and 26.

I claim:

1. A soil pulverizing device comprising means for forming a furrow slice, a lifting member associated with said means, said lifting member being shaped to perform only the initial part of a turning-over movement of the furrow slice, a substantially upright shaft, means for rotating the shaft, a series of blades fixed to the shaft and arranged in substantially horizontal positions, the position and location of the shaft and its blades relative to the means for forming a furrow slice and the lifting member being such that the entire path of travel of the blades is confined to the area on that side of the landside of the plow toward which the means for forming a furrow slice is extended, and also such that as the furrow slice passes beyond the lifting member the blades will cooperate with the lifting member in completing the turning-over movement of the furrow slice and also in pulverizing the entire furrow slice from a point adjacent the lower edge of the furrow slice to the upper portion thereof.

2. In an implement of the class described, the combination of a plow share, a lifting member associated with the plow share, said lifting member being shaped to perform only the initial part of a turning-over movement of the furrow slice, a substantially upright shaft, means for rotating the shaft, a series of blades fixed to the shaft and arranged in substantially horizontal positions, the position and location of the shaft and its blades relative to the share and lifting member being such that the entire path of travel of the blades is confined to the area on that side of the landside of the plow towards which the plow share is extended, and also such that as the furrow slice passes beyond the lifting member the blades will cooperate with the lifting member in completing the turning-over movement of the furrow slice and also in pulverizing the entire furrow slice from a point adjacent the lower edge of the furrow slice to the upper portion thereof.

Signed at New York, in the county and State of New York, this 2nd day of March, 1926.

FRANK S. SHIELDS.